Oct. 9, 1934.  J. BLEWETT  1,976,382
MACHINE FOR CLEANING SEED COTTON AND FOR EXTRACTING
THE SEED COTTON FROM BURRS AND HULLS
Filed Dec. 17, 1930  3 Sheets-Sheet 1

Inventor
John Blewett
By Mitchell, Chadwick & Kent
Attorneys.

Oct. 9, 1934.  J. BLEWETT  1,976,382
MACHINE FOR CLEANING SEED COTTON AND FOR EXTRACTING
THE SEED COTTON FROM BURRS AND HULLS
Filed Dec. 17, 1930  3 Sheets-Sheet 2

Inventor
John Blewett
By Mitchell, Chadwick & Kent
Attorneys.

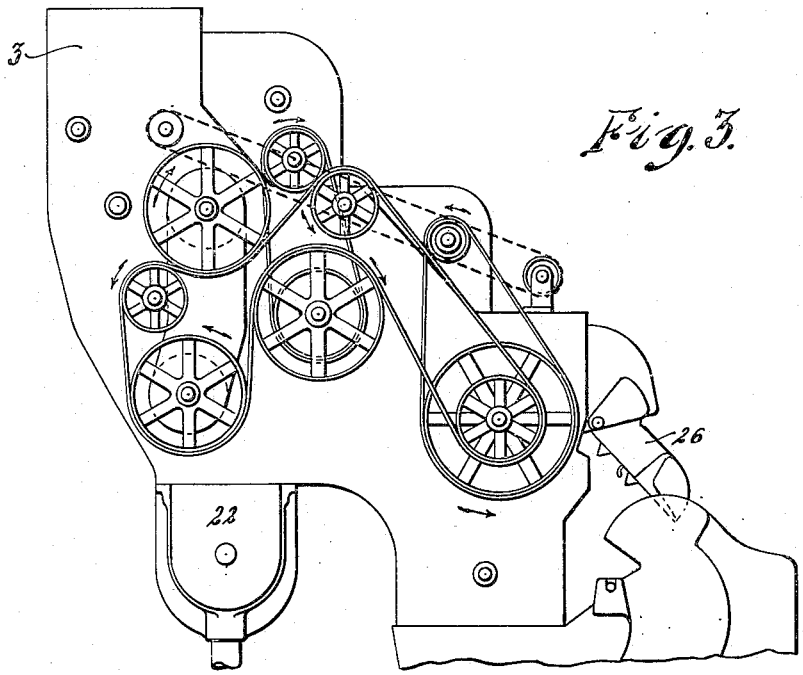
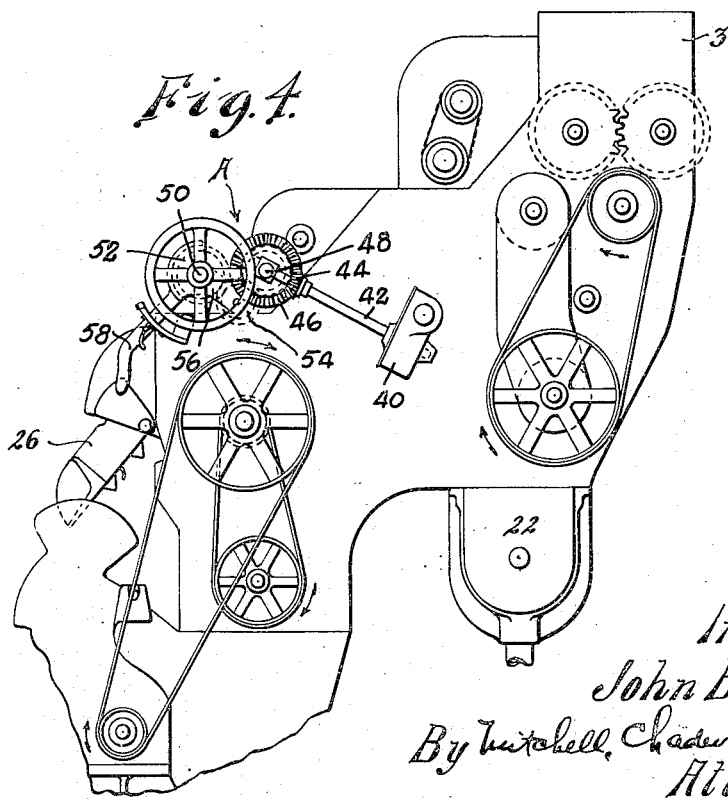

Patented Oct. 9, 1934

1,976,382

UNITED STATES PATENT OFFICE 1,976,382

MACHINE FOR CLEANING SEED COTTON AND FOR EXTRACTING THE SEED COTTON FROM BURRS AND HULLS

John Blewett, Dallas, Tex., assignor to The Murray Company, Dallas, Tex., a corporation of Texas Application December 17, 1930, Serial No. 502,933

9 Claims. (Cl. 19—37)

My invention relates to improvements in machines for cleaning seed cotton and for extracting the seed cotton from burrs and hulls. While the invention will doubtless find its principal use in preparing and feeding cotton to a gin, and is herein illustratively described only as if used for that purpose, it also provides a superior grabbot machine, more efficient than any other known to me, for reclaiming seed cotton and lint from the grabbots of trash, hulls and other foreign matter which is screened out of the gin run cotton seed, as this is received at the oil mills before de-linting.

By its thoroughness of separation of seed cotton and lint from foreign matter, and by a mechanism which re-treats the latter by the same extracting drum, yet avoids mixing it with the fresh in-coming material, the invention aims to attain a high efficiency of the machine as a whole; a superior quality of output; and a larger capacity of output per hour, size for size, than is attainable with machines previously proposed.

To this end the machine provides an improved organization of pickers, percussion elements and dust screens; and it provides other operating elements, details, and arrangements for handling and acting upon the material as will appear herein.

In the accompanying drawings:

Figure 3 is an end elevation of one end of the machine; and

Figure 4 is a similar view of the other end of the machine.

Figure 1:
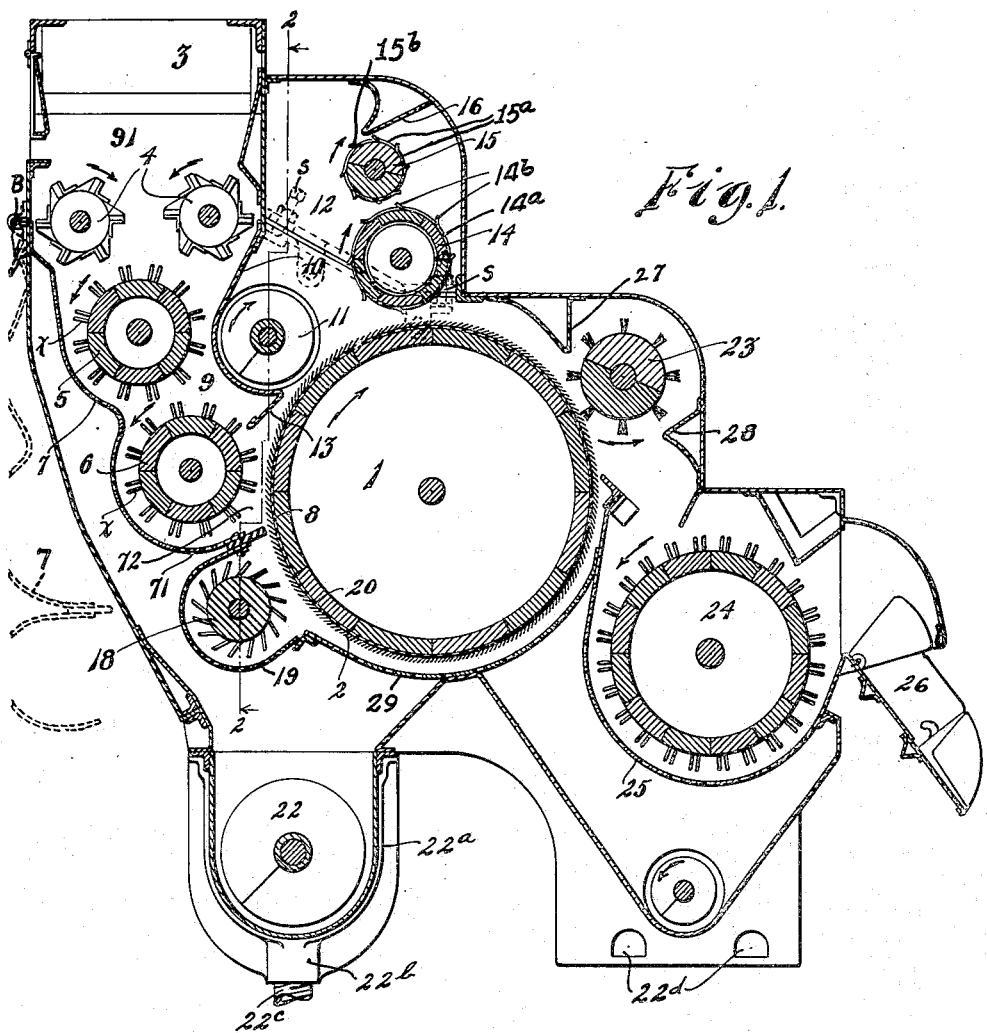
Figure 1 is an elevation, in vertical section, of my improved machine.
Figure 2:
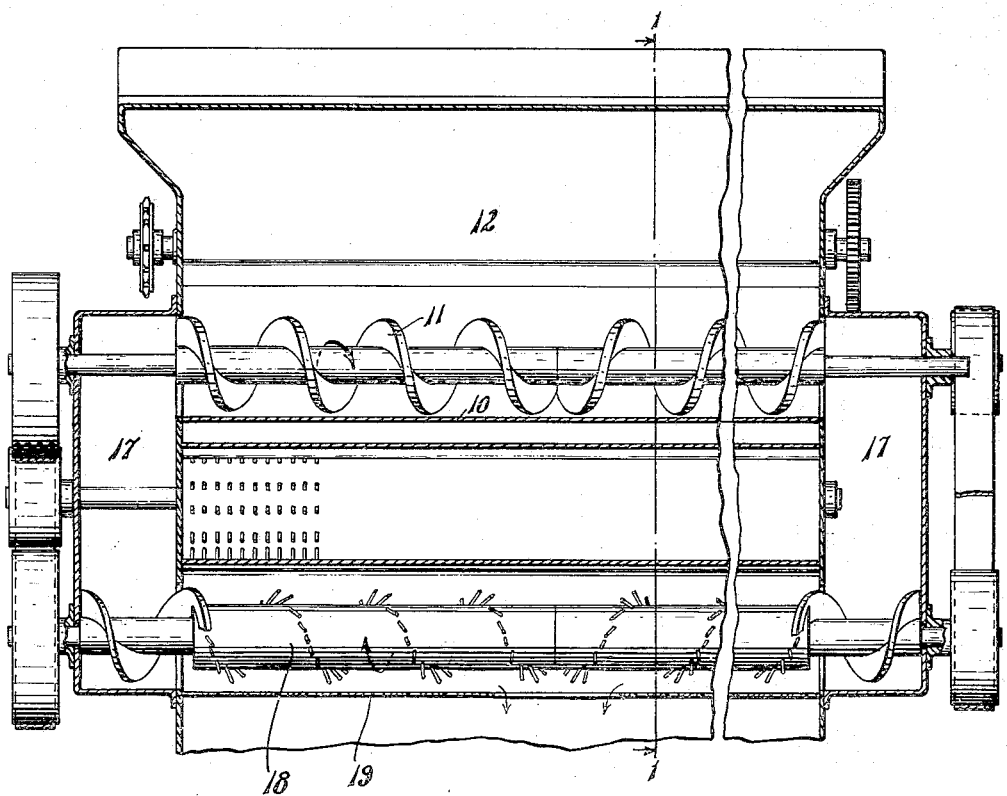
Figure 2 is a section on line 2—2 of Figure 1, with a portion broken away.

Cotton hullers and cleaners of the general type to which the invention relates embody an extracting drum as the principal working element, with the coacting elements arranged around it to separate and beat out trash, dirt and dust, while feeding to the drum the seed cotton which is to be cleaned, removing it from the extracting drum, and delivering the cleaned seed cotton into a gin or other desired place.

Although the machine illustrated is intended especially for use over a gin, as is indicated in the drawings, it may obviously be made in various sizes and arranged to deliver as desired, for example, to a cotton conveyor. The frame and casing which enclose and support the various elements making up my machine may be of wood or metal and will naturally be so designed as to provide bearings for the various shafts controlling the moving parts.

Referring to Figure 1 of the drawings the various elements are clearly shown as they are arranged with regard to drum 1 and to each other. The cotton to be cleaned of its burrs, hulls and trash is fed into the hopper 3, in the bottom of which are the usual feed rollers 4. These preferably are provided with a variable speed device, which may be of a type already known, shown at A, Figure 4, that can be adjusted for the feed rollers 4 to feed the seed cotton downward at a pre-determined regular rate, in a continuous stream or sheet.

Beneath the feed rollers 4 I prefer to arrange two picker or beater rolls 5, 6, one over the other, these rolls being provided on their surfaces with projecting spikes or pins $x$ for the purpose of engaging and actuating the seed cotton in the operation of the machine. Opposed to these beater rolls 5, 6, is the foraminous wall 7 of a sinuous chute. This wall is preferably bent to follow the contour of the rolls 5, 6, and is adapted to sustain and guide the seed cotton in proximity to the beater rolls. The space between the wall 7 and the beater rolls constitutes the downward sinuous chute, down which the material passes by gravity, assisted by the pins $x$, which engage and drag it over the foraminous sinuosities, and thus tend to disintegrate any seed masses or lumps, open bolls, loosen trash, and shake out dust and dirt.

The chute 7 ends at a floor 71 which is a continuation of the foraminous plate around under the lower beater 6, and is more or less horizontal; and there it delivers the material through a vertical side opening 72 against the cotton seizing surface of the drum element 1. The edge part 8 of this floor, next to the drum, is flexible and elastic, being made, for example, of a somewhat stiff sheet of rubber. For this purpose a piece of rubber belting serves very well. This flexible edge stands close to the teeth 2 of drum 1, and is stiff enough to prevent escape of material from the chute floor downward, but is capable of yielding upward to permit other material, as seeds or hulls carried on the drum 1, to pass freely upward from the part of the machine which is below. That side of the lower beater roll 6 which is toward the drum 1 is moving upward, as is the adjacent surface of the drum; and all material that reaches the floor 71 is by this means fed to and forced against and into, the teeth of the drum; but just where the rotating beater pins $x$ begin to move away from the drum 1 is a fixed stiff plate 13, projecting down obliquely toward them from the side on which the drum is, preventing material from continuing around with the beater pins, and guiding it to follow the teeth of the drum 1.

The beater rolls 5, 6, it will be observed, are set in a sinuous descending chamber 9 whose upper end 91 is at the feed rolls 4, and whose lower end is closed by the foraminous floor 71, the drum 1 and the stiff plate 13; while its sides are formed, one by the foraminous wall 7 of the chute and the other by the sheet metal wall 10 of an upper intermediate chamber 12 which lies between it and the upper part of the drum. The bottom of this wall 10 is curved toward the drum 1 so as to make one half or side of a trough, whose other side is missing except as it is formed by the adjacent convex side of the drum or of any masses of cotton which may be thereon, wherein is mounted a two-way conveyor 11, which may move contents either from middle to ends, as illustrated, or the reverse, if the conveyor be so designed. The lower edge of the half 10 of the trough extends toward said upper part of the drum 1, and is rather close to it, although leaving room for seed cotton, with more or less burrs attached, to be carried up by it on the surface of the drum. From this edge, said sheet metal 13 extends stiffly downward and a little away from the drum toward the lower beater 6, and serves a triple function. It constitutes a closure for the chamber 9, to compel material therein above the picker 6 to pass around with that picker over the lower part of the wall 7; it prevents material below it in the chamber 9 from being carried up and around by the spiked roller or picker 6, and clears it from that picker; and it constitutes, in cooperation with the surface of the drum, a sort of contracting throat, by which the grip of the drum on cotton moving into the throat may be made more secure. As it is a continuous plate, parallel to the drum, some of the bolls or masses that may have passed intact the earlier, spiked or wider spaced, elements may be crushed as they pass, or may be broken and a part pushed back while the part more securely held by the drum is carried on.

It is a feature of my improved machine that ready access may be had to the interior when desired. To this end one side section of casing is hinged and can be swung outward as indicated by the fragment B shown in dotted lines in Figure 1. And the sinuous wall 7 which is mounted on this movable section also moves outward to uncover the interior elements so that the various parts and passages may be cleaned or other work done within the casing. The hinged side section of casing has its hinge at its upper end, and may be locked by any suitable securing means at its lower end.

The intermediate chamber 12 is the main place for the separation of burrs from the drum, whose surface, preferably of card cloth, is engaged with the lint. The knocker 14, rotating so that the adjacent surfaces of roll 14 and drum 1 travel oppositely, acts as a percussion element to engage all lumps carried on the drum and beat them off into trough 10. I prefer to mount another knocking roll 15 above the roll 14, rotating in the same direction as roll 14 and positioned to clear it by knocking off any hulls and cotton which may have adhered to it. And a fixed barrier plate 16 above the upper knocker roll 15 completes the perfection of clearing, by preventing the latter roll from carrying around any substantial amount of the material. While the knocker rolls 14, 15 may be of any suitable construction, I prefer to employ for each a sectional, wooden body whose surface is completely covered by metallic plates. The plates of knocker 14 are indicated at 14$^a$, while those of knocker 15 are designated 15$^a$. Each plate has one of its edge portions turned outward, as at 14$^b$, 15$^b$ to provide, for each knocker, a series of longitudinal knocker strips which constitute the material-engaging elements which effect the desired kick-back of material. And these strips 14$^b$, 15$^b$ are set tangent to circles within the respective knocker bodies so that the turned out edges lag in the rotary travel of the knockers. The barrier 16 is of somewhat V-shape in cross-section, with one side approximately tangent to roller 15 while the crest of the V engages and strips material on upper knocker roll 15; and with the face above this crest of arcuate shape, so that, as material is stripped from roll 15, it may follow up along the arc of this barrier face and be curved and directed backward to a position where it can drop into the conveyor 11 and trough 10. In this manner I ensure against material becoming packed above the knocker rolls, against the upper casing walls, a condition which would interfere with smooth, continuous and efficient action. All of the material knocked from drum 1 is kicked back, with incidental agitation, into trough 10.

All kinds of material loose enough to be separable from drum 1 will fall into trough 10, where the conveyor 11 promptly moves the greater part of it away from the drum 1 and keeps it separated therefrom. This includes burrs, hulls, trash, etc. and occasional bunches or wads of cotton. Of the latter, such large wads as land on the blades of the slowly rotating conveyor may fall back against the drum; and if these happen to strike a place where the card teeth are not already filled with cotton they will be immediately again carried up against the knocker 14, and perhaps then be carried past the knocker or be broken into smaller locks.

By having the two stripper rolls, 14 and 15, rotating in the same direction and one above the other, and especially with the closely set barrier 16 above the roller 15, the loose hulls and cotton can be practically separated by this agitating in chamber 12,—the top knocker or stripper roller 15 keeping the hulls from passing over the top of the knocker 14; and the baffle 16 serving the same purpose for the roller 15. But, owing to the small diameter of the core of the conveyor, the separated burrs and hulls and the smaller material beaten back from 14 will fall into the lower part or floor of the trough, where the blades of conveyor 11 are moving toward the back of the trough, away from the drum. Such material therefore is kept away from the drum while being conveyed along the trough to the outside of the machine.

According to the invention the knocker rolls 14, 15 and the barrier 16, together with their enclosing section of casing, are mounted for vertical adjustment as a unit, to vary the space between drum 1 and the knocker roll 14. Thus, by adjusting the screws s, s, this unit may be set a little higher or lower with respect to drum 1, thereby to permit greater or less thickness of material to pass on the drum.

The material which is conducted along trough 10 and out at either end is deposited into one or the other of the chutes 17, leading to a lower level where another conveyor 18, operating in a foraminous trough 19, conducts it back within the casing.

Each of the conveyors 11, 18, is herein illustrated as having one-half of its extent a helix or spiral in one direction and the other half spiral in reverse direction. In the particular style illustrated, the upper conveyor 11 moves material outward from the middle to the outside passages 17; and the lower spiked conveyor 18 moves material from each side inward toward the middle, where an opening 21 in the bottom lets it fall into a suitable carrying-off conveyor 22 below. The upper conveyor 11 preferably will be of the screw type, i. e. with blades of continuous metal extending to the main casing, whence the conveyor shaft extends across the upper end of each chute 17 for support in suitable bearings. By having this conveyor deliver into the chute 17 without itself projecting thereinto I prevent material from becoming packed against the chute walls, with incidental choking of the machine. The lower conveyor 18, however, extends across each chute 17 and can move material from any part of this lower end of the chute. This conveyor preferably will be of the spirally spiked type and will have a relatively large core, except that its end portions, which are in chutes 17, preferably will be of the screw type, with smaller core. Thus the ends are adapted to receive material from above and to force-feed it into the casing with a minimum of agitation. And the spiked section within the casing effects the desired agitation of material while its large core necessitates the material being close to the drum 1 so as to make contact with it while being conducted toward the central outlet 21.

Burrs, hulls and other waste material, as soon as they are once separated from the cotton on drum 1 by the knocker 14, are thus in general maintained separate and apart from the main feed of cotton on which the machine is working. But some lint is among them and there may be among them some unbroken masses. If the mass is large enough it may catch on the drum 1, to which one open side of the trough is exposed. But all material which becomes fully under influence of the conveyor 11 is kept away from drum 1 at that place, and passes down to conveyor 18, which latter rotates in direction tending to push material against the drum. Therefore in the course of its travel along 18, any remaining lint will be caught by the teeth of the drum, which at this point in its rotation will be empty, and will be carried upward, passing the chute floor 71 by the yielding of the elastic edge 8. The hulls and dirt which have not enough lint to be thus carried up continue along the trough to the central exit 21 and thence are carried out of the machine by the conveyor 22. The hold of those which had enough lint to be seized is made more secure on the drum by the pressure of fresh, incoming material upon them as they pass the lower beater 6. Then they come again under the action of the knocker 14, but, by the construction described, this has been accomplished without the mass of waste matter knocked off by the roller 14 having been mixed with the incoming material. This promotes both efficiency, thoroughness of action, and increased capacity of machine. The having of the trough 10 open or exposed to the drum 1 for the whole of one side of the trough, helps get the larger rejected masses immediately re-treated in chamber 12, without their having to go over the drum again from conveyor 18, and avoids all chance of their delaying any fresh material while so doing. The contracting throat between plate 13 and drum 1 makes the hold of the drum more secure on all thicker masses of cotton, and so improves the chance that when struck by the knocker 14 the foreign matter will be dislodged without also throwing off the lock of lint.

The seed cotton, carried by the drum past knocker roll 14, continues on the drum until, at a point beyond the chamber 12, it is cleared from the drum by means of a doffer roll 23, or the like, moving faster than the teeth of the drum are moving. And in its course to the doffer roll, the seed cotton passes a barrier 27 which is designed to serve as a shield to prevent the air currents, set up by the swiftly rotating doffer, from blowing material from the drum and back into the passage through which it came. Also I prefer to form the barrier 27 with its face which is toward the drum arcuate in shape to further minimize any clogging tendency in this region.

The doffer 23 throws the cotton, for final cleaning, upon a picker cylinder 24 below, whose belt drives it slowly in comparison with the speed of said doffer. And a stripping barrier 28, prevents material being carried around on the doffer. This barrier element also has an arcuate under face which tends to prevent packing and clogging at the outlet from the doffer chamber. An iron screen or other foraminous wall 25 is associated with cylinder 24, and the cotton is swept and rolled along the wall 25 slowly enough for dust and dirt to sift through the screen. The completely cleaned product is thus swept by the cylinder 24 into a discharge chute 26 which in turn may deliver into the breast of a gin; into a cotton conveyor; or to any other desired mechanism or place.

Both of the barriers 27, 28 are substantial V-shape in cross section, and made of stiff sheet metal. And each constitutes a guide for the lint cotton and for currents of air generated by the doffer 23. In conjunction with that portion of the doffer which is toward the drum and that portion of the drum which is toward the doffing chamber, the barriers 27, 28 provide an approximately straight tangential passage for the doffed material, and for the air currents, leading to the cleaning chamber below.

The carrying-off conveyor 22 may serve for a plurality of machines, it extending longitudinally underneath the main casing at a rear location, with its trough open upward at the place where it receives dirt, trash and waste matter from a particular machine. It is supported in proper working relation to casing 10 by means of the brackets 22$^a$, in the form of yokes, which engage around the trough with their ends serving as supports for the casing above. Each yoke bracket 22$^a$ has a socket 22$^b$, and a post 22$^c$, upstanding from the floor, engages in the socket, and is adjustable therein to vary the elevation of the bracket 22$^a$ and the conveyor 22 and the casing above.

The front end of the casing has the supporting elements 22$^d$ which are adapted to rest on a gin or other supporting structure.

Practically all of the seed cotton carried on the drum 1 past the knocker 14 will be doffed in the manner above described and will pass on out of the machine. Some little however may be held so tightly by the teeth of the drum as to fail of being doffed. I provide for reclaiming this in the course of further rotation of the drum. To this end there is provided a reclaiming screen 29 around the under side of the drum and extending from a point just beyond doffer 23 to a point adjacent to the lower conveyor trough 19. And the narrow space between drum 1 and the screen, constitutes a passage for material to be carried around past the reclaiming screen 29, with more or less incidental agitation and loosening. Thus loosened, and minus dust and dirt which may have sifted through screen 29, it continues on the drum, or is thrown by the conveyor 18 against the drum, to be carried again to doffer 23, this time to be doffed for final cleaning and passage out of the machine.

From the foregoing description, it will be seen that my machine gives selective re-treatment, or what may be called duplex separating and cleaning, to such separated burrs, hulls and trash as have lint attached; but that which is to receive duplex treatment is first separated from the main body of the material being handled; that only the lint-bearing portion of it goes over the drum a second time; and that this portion gets its further treatment by being applied to a fresh, empty part of the drum. The bulk of seed cotton extracted by drum 1 is conducted directly through the machine. Thus the efficiency is enhanced, as compared with those machines in which the knocker throws the burrs and trash back into the stream of material which is being presented to the surface of the drum, increasing the proportion of burrs therein and occupying space that in the present machine can be used by fresh material. This latter feature is another which tends to make it possible to get a larger output with a machine of given size.

Cooperating to make a perfect product, from lint material which thus is not presented repeatedly to the drum, are devices which, without delaying the progress of the cotton through the machine, give it extra preliminary and final cleaning. The beater rolls 5, 6, in a sinuous foraminous chute give duplex action on the incoming material to separate small loose particles. And fragments broken but not knocked off by the knocker 14 have superior opportunity to escape in moving slowly over the curved screen 25, with plenty of time for the small particles to work through. The slowness is attained by making the picker 24 separate from the doffer 23; and thoroughness is gained by making the course of this screen 25 lie through a curve downward, then laterally, then upward to the place where the cleaned seed cotton is delivered from the machine.

While the lint engaging element is illustrated, and, for brevity, is described and mentioned in the claims, as being a drum, it is recognized that its function may be served by other devices which are known as substantial equivalents.

In connection with all of the above I prefer to employ a selective change speed gear mechanism whereby a change from one speed to another may be effected while the machine continues in operation.

Such a mechanism is indicated generally at A in Figure 4 of the drawings. It comprises a box 40 within which are housed a worm (not shown) on the projecting end of the shaft of drum 1, and a worm wheel (not shown) on a shaft 42, meshing with the worm. Shaft 42 carries at its other end a beveled pinion 44 meshing with a beveled gear 46 on a stub shaft 48, which latter shaft also carries a step cone of gears (not shown) located just back of bevel gear 46 in Figure 4.

A gear train is slidable along a shaft 50, opposite the said step cone gears. One gear of the train, indicated at 52, is slidably keyed to shaft 50, while the other one 54, in mesh with 52, is mounted in a yoke 56, and may be brought into or out of mesh with the gears of the step cone by means of the handle 58. The train of gears 52, 54 are slidable along shaft 50 to bring gear 54 in mesh with any one of the gears of the step cone.

Since all of the details of the described change speed gear are disclosed in United States Patent 1,732,550, the above brief description will suffice here. The only departure from the disclosure of the said patent resides in a chain and sprocket drive connection between shaft 50 and the shaft of one of the feed rollers 4, in the present instance, (seen in Figure 3) while in the patent the feed roller shaft corresponds to this shaft 50 and the gear train is mounted directly on it.

I claim:

1. In a machine of the class described, a lint engaging drum and a knocker for separable material thereon, combined with a feeding chamber to the drum having, at its delivery end, a feed-barrier plate oblique to the drum and forming therewith a contracting throat, said plate having its entrance end set further from the drum surface than its discharge end, and being set with its face gradually approaching the drum surface and there being a gaping mouth from the feeding chamber to the space in said throat between said plate and drum by which fed material advancing with the drum is compressed against the drum.

2. In a machine of the class described, a lint engaging drum and a knocker for separable material thereon, combined with a feeding chamber to the drum having a downward passage with, at its end, a vertical opening to an upward moving portion of the drum; the said chamber having a foraminous wall on its side remote from the drum; a beater, rotating over across the chamber end, and down along said wall to deliver cotton along the screen to the lower part of the opening, and thence rotating upward beside the upward moving drum; and a stiff plate, forming part of the chamber end, and terminating close to the beater, deflecting cotton, inside the chamber to the beater and outside the chamber from the beater.

3. In a machine of the class described, a lint engaging drum and a knocker for separable material thereon, combined with a feeding chamber to the drum; a chamber and conveyer therein for separating and removing, from the drum and feed, matter which is knocked off the drum; and a chamber containing a conveyer for re-feeding matter thus removed, to the drum; the feed chamber being located between the conveyer chambers and having an elastically flexible edge close to the drum, permitting re-fed material to pass up, and preventing originally fed material from passing down, at that place.

4. In a machine of the class described, a lint engaging drum and a knocker for separable material thereon, combined with a trough arranged to receive knocked-off matter, one side of said trough being a wall separating its contents from material that is being fed; and the other side of said trough being open to the drum, for matter at that side of the trough to be re-caught, a feeding chamber to the drum, close under said trough, having a contracting delivery throat one side of which is constituted by the drum, and the other side of which leads past the bottom of said trough; there being in the trough a conveyer working away from the drum, set close enough to the adjacent exposed surface of the drum to engage material thereon having more thickness than the width of said throat.

5. In apparatus of the class described, a lint engaging cotton carrying drum; an auxiliary roller for operating on material separated from the drum; and a guiding element for material cleared from said roller; said element being V-shaped of stiff sheet metal wherein the crest of the V is close to said roller; and the portions of sheet metal leading from the crest of the V extend, respectively, the one in a direction approximately tangential to the roller and the other in a direction which is at an angle and has curvature guiding the separated material in the path in which it should go; the two ends of the V constituting bases for rigidly supporting the crest of the V in position adjacent to said roller.

6. In a machine of the class described, a lint engaging cotton carrying drum; means for feeding hully cotton thereto; means for knocking back separable material from the drum; means therebeyond for doffing cotton remaining on the drum; a barrier in advance of said doffing means, having a shielding wall toward said doffer and a concave face toward said drum, which said concave face provides a contraction of the passage to said doffer; and a stripper barrier beyond and adjacent to said doffer means, having a face concave toward the outlet from the doffer means, thereby tending to prevent packing of cotton in said outlet.

7. In a machine of the class described, a lint-engaging cotton carrying drum; means for feeding hully cotton thereto; means for knocking back separable material from the drum; a conveyor for receiving and moving the material thus knocked back; a passage to which this conveyor delivers material; a second conveyor, receiving material from the first conveyor, arranged and adapted to thrust it toward the drum; said second conveyor having a continuous screw flight at the place where it receives as aforesaid, and being spirally spiked where it is beside the drum.

8. In a machine of the class described, a lint engaging cotton carrying drum; means for feeding hully cotton thereto; means for knocking back separable material from the drum; a conveyor for receiving and moving the material thus knocked back, there being a gravity passage into which said conveyor delivers; a second conveyor receiving material from the first, arranged and adapted to thrust its material toward the drum; said second conveyor extending into said passage and there having screw flights, and being spirally spiked, with large core, where it is beside the drum; whereby the screw flights force-feed the material out of said passage, and said core and spiral spikes thrust it against the drum.

9. In a machine of the class described for feeding a gin, a casing having front supports adapted to rest on top of a gin stand; a conveyor and trough extending underneath said casing, at a rear location; brackets having a yoke engaging around said trough, supporting the trough and having each a screw socket under the yoke adapted for connection between the bracket and a vertical, supporting post.

JOHN BLEWETT.